Jan. 22, 1957  H. B. FREY, JR., ET AL  2,778,950
METHODS AND APPARATUS FOR LOCALIZED NEUTRON LOGGING
Filed Dec. 30, 1952  2 Sheets-Sheet 1

INVENTORS
HUGH B. FREY, JR.
JAY TITTMAN
BY Campbell, Brumbaugh, Free & Graves
THEIR ATTORNEYS

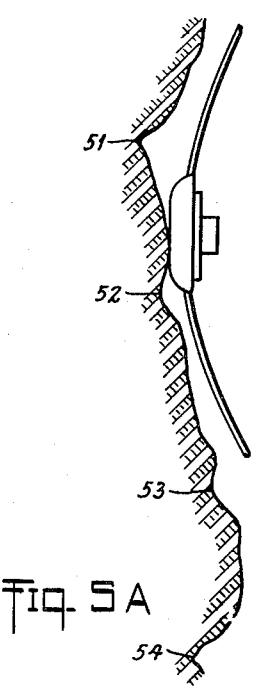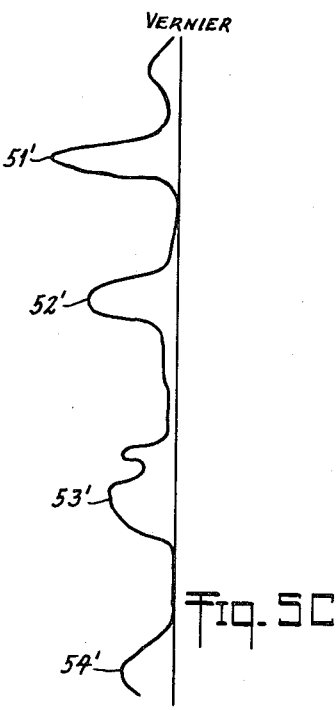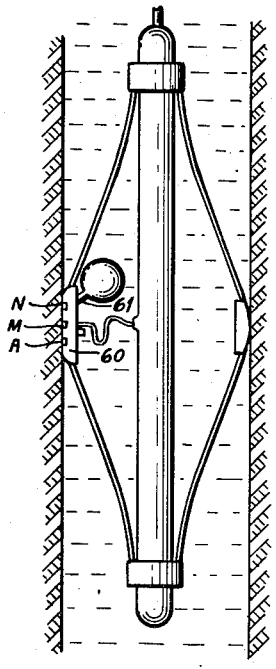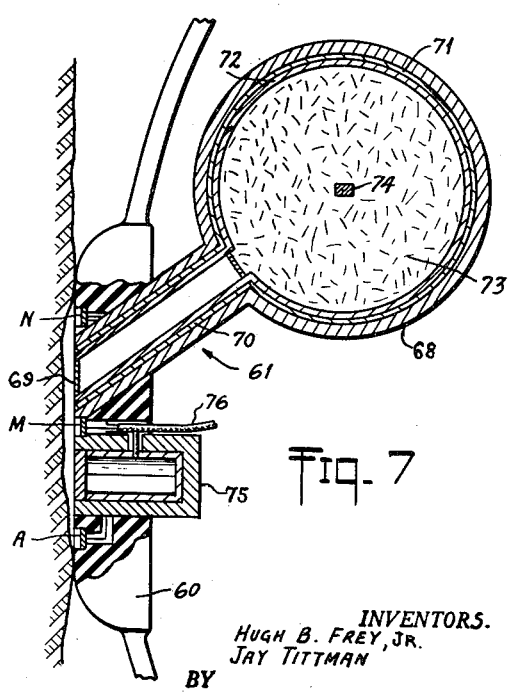

United States Patent Office 2,778,950
Patented Jan. 22, 1957

2,778,950
METHODS AND APPARATUS FOR LOCALIZED NEUTRON LOGGING

Hugh B. Frey, Jr., Ridgefield, and Jay Tittman, Danbury, Conn., assignors to Schlumberger Well Surveying Corporation, Houston, Tex., a corporation of Delaware Application December 30, 1952, Serial No. 328,676

18 Claims. (Cl. 250—83.6)

This invention relates to methods and apparatus for neutron-neutron logging. More particularly, it concerns novel systems for obtaining information as to the nature of the side walls of boreholes drilled into the earth.

In the past, one technique of neutron-neutron logging has involved irradiating earth formations with relatively high-energy neutrons and detecting these neutrons after they have been reduced to a low-energy level by the formations. Much research has been carried out in an effort to isolate the neutron sources and detectors from the drilling liquids in boreholes in order that the slowing down or moderation of the neutrons detected may be properly attributable to earth formations rather than to the mud or drilling liquid.

The present invention has to do with a new technique in neutron logging in which the presence of mud or drilling liquid is taken advantage of in order to obtain localized information about the side walls of a borehole.

It is an object of the invention to provide novel methods and apparatus for ascertaining the presence of small fractures, grooves, or fissures of the order of a quarter inch wide in the side walls of a borehole drilled into the earth.

Another object of the invention is to provide information indicative of the presence or absence of mud cake on borehole side walls.

Still another object of the invention is to provide apparatus pressed against the wall of a borehole by the transversely movable arm of an ordinary borehole caliper for detecting smaller variations in the borehole diameter than can be measured by movement of the caliper arm.

A further object is to provide novel methods and apparatus in combination with well logging instruments for indicating the effects of wall irregularities on the measurements of such logging instruments.

The invention contemplates detecting surface irregularities in the wall of a borehole containing hydrogenous liquid by emitting either slow neutrons or thermal neutrons from a point adjacent the wall of the borehole, and detecting either the slow neutrons that have been thermalized, i. e. brought to substantially thermal equilibrium, or the thermal neutrons that have been returned by the residual liquid present between the point of neutron emission and the wall.

Suitable apparatus comprises a source of neutrons, the initial energy of which is determined by the depth of the surface irregularities that are to be investigated, and a thermal neutron detector substantially in the same transverse plane with the neutron source. Shielding is provided about the detector and the source in a manner to permit essentially unidirectional detection of the neutrons. This combination of elements, hereafter referred to as a probe, is urged against the borehole wall. In one embodiment, the neutron logging probe is positioned on the end of a calipering arm and acts as a vernier with respect to the main calipering apparatus. In another embodiment, the probe may be combined with a well logging apparatus, such as, for example, an electrical logging instrument of the type wherein electrodes are urged against the borehole wall.

In all the contemplated embodiments, the operation depends upon the slowing down and/or thermal diffusion of neutrons in the mud or liquid medium in the well. Thus, when minute grooves or cracks are present, small amounts of mud or drilling liquid will be present between the probe urged against the wall and the wall itself. In fact, these small irregularities in the wall will generally be filled with mud or, where the formations are highly permeable, a mud cake will have formed. Such entrapped liquid will slow and/or diffuse neutrons from the source and tend to prevent them from reaching the formations. The number of thermal neutrons present and thus detectable will depend upon the depth of the trapped liquid or mud cake and the initial energy of the neutrons. The recorded counting rate of thermal neutrons will consequently increase in the presence of such irregularities. However, if the wall is smooth and uniform, most of the neutrons ejected from the source will pass directly into the formations where they will then diffuse over a large volume of the formations and decrease the probability of their return to the detector. Under these conditions a low counting rate will be recorded by the detector.

In order that the invention may be more fully understood, it will now be described in detail, reference being made to the accompanying drawings in which:

Fig. 5A is a longitudinal sectional view of a fragment of a typical borehole side wall;

Fig. 5B is the relatively coarse graph obtained by a conventional caliper of the side wall fragment shown in Fig. 5A;

Fig. 5C is the detailed graph obtained by the neutron probe of the present invention revealing the surface irregularities of the fragment of side wall shown in Fig. 5A;

Fig. 6 is a schematic view of a further form of the neutron logging probe disposed in a borehole in combination with a well logging instrument; and Fig. 7 is a longitudinal sectional view on an enlarged scale of the probe shown in Fig. 6.

Figure 1:
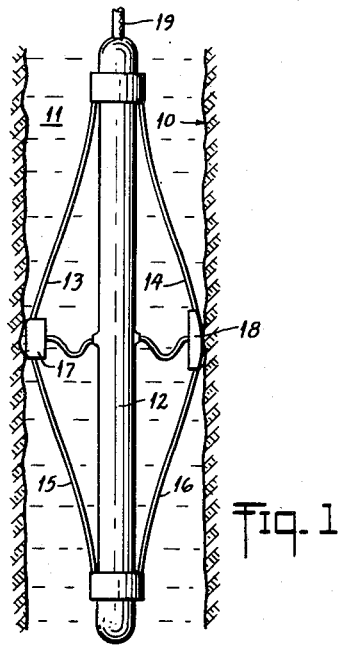
Fig. 1 is a schematic view of one embodiment of the neutron logging probe of the present invention disposed in a borehole with associated apparatus.

Referring now to Fig. 1, there is shown a borehole 10 containing a drilling mud 11. The logging apparatus may comprise an elongated cylindrical housing 12 slidably supporting oppositely disposed bowed upper springs 13 and 14 and corresponding lower springs 15 and 16 at their upper and lower ends, respectively. The springs 13 and 15 are arranged to support a neutron logging probe 17, and resiliently urged it against the side wall of the bore hole. The springs 14 and 16 support a pad 18 pressed against the opposite side wall to balance the force exerted by the springs 13 and 15 and thus maintain the housing 12 centered in the borehole. The pad 18 may include electrodes for making electrical logs simultaneously with the neutron log. Other well known means for supporting and urging the neutron logging probe 17 against the side wall of the borehole 10 may, of course, be employed.

A cable 19 is secured to the housing 12 to raise and lower the apparatus in the borehole in a known manner and incorporates electrical conductors for making connection with control and indicating apparatus (not shown) at the earth's surface.

Figure 2:
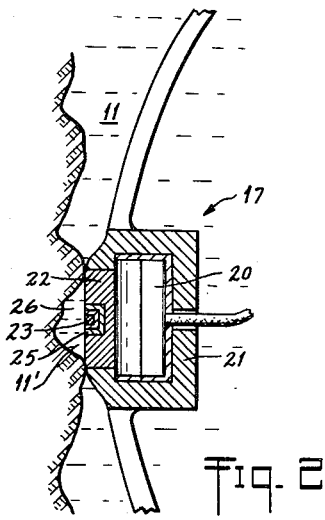
Fig. 2 is a longitudinal sectional view on an enlarged scale of the probe shown in Fig. 1.

As shown in Fig. 2, the probe 17 may comprise a cylindrical neutron detector 20 preferably of the pulse ionization chamber or proportional counter type filled with boron-trifluoride gas. This detector is constructed to be sensitive to thermal and/or epithermal neutrons.

As is well known, neutrons having an energy in the desired range react in the detector to yield ionizing particles which cause a pulse of current to flow through the detector. Conventional amplifying and scaling apparatus contained in the housing 12 is adapted to transmit amplified pulses over the cable 19 to indicating apparatus (not shown) at the earth's surface where, for example, a recording galvanometer may record the neutron pulse rate as a function of the position of the probe 17 in the borehole.

A shield 21 surrounds the detector 20 except for the front facing the borehole wall where there is disposed a cover 22 of solid aluminum, for example. A source 23 of slow neutrons is located in the center of the cover 22. The shield 21 is preferably made of material containing either cadmium or boron, which are relatively opaque to thermal and slow neutrons, respectively. The cover 22, on the other hand, is transparent to such neutrons. In the event that the source 23 is of sufficiently low energy for boron shielding to be effective, it is surrounded on all sides except the one facing the borehole wall by a boron-containing shield 25. This shield 25 is essentially opaque to the neutrons coming directly from the source and thus serves to shield the detector 20 therefrom. With this construction, the zone of investigation is confined to a region immediately in front of the logging probe 17.

In order to avoid interference from gamma radiation, it is necessary to operate the detector 20 in the ionization chamber region or in the proportional counter region and not in the Geiger counter range. The pulse height in the former regions due to the slowed neutrons bombarding the nuclei of the gas in the detector to cause ionization by disintegration, will be many times the pulse height due to gamma radiation, while in the Geiger region all the pulse heights are substantially the same and direct gamma radiation from the source 23 will mask the pulses due to neutrons. Thus, when operated in the ionization chamber or proportional counter regions the smaller pulses due to gamma radiation can be clipped leaving only pulses due to the neutrons.

However, should a counter be used of the type operating in the Geiger region and which detects slow or thermal neutrons by counting gamma radiation produced by materials disintegrating in the presence of such neutrons, it would be necessary to shield the counter from all gamma radiation due to any source other than that caused by the slow neutrons. This could be accomplished by lining with lead those portions of the detector exposed to undesired sources of gamma radiation. However, this shielding arrangement tends to be bulky and complicated.

In operation, the logging apparatus is moved through the borehole 10 by the cable 19. Neutrons from the source 23 which may consist of antimony 124-beryllium, for example, escape towards the adjacent side wall. These neutrons will travel certain distances depending upon the slowing down and diffusion lengths in the mud, mud-cake, or material directly in front of the source. Thus, when the probe 17 is passing a small cave, groove, or crack, such as indicated at 26 in Fig. 2, the entrapped liquid or mud 11' between the probe 17 and the borehole side wall will slow virtually all neutrons ejected from the source 23, and the detector 20 will register a high counting rate for thermal neutrons. On the other hand, when the probe 17 is passing a smooth wall section such that most of the drilling liquid is squeezed out from between the probe 17 and the side wall by the shield 22, comparatively few thermal neutrons will be detected.

These results arise from the fact that the slowing down and diffusion lengths for neutrons are very short in drilling liquids as compared to other materials such as packed limestone or non-porous rock formations. As a specific example, the slowing down length of 24 thousand electron volt (24 k. e. v.) neutrons in water is roughly 2.1 centimeters while the experimental value for the thermal diffusion length is about 2.8 centimeters. The migration length for neutrons of this initial energy is thus about $\sqrt{2.1^2 + 2.8^2}$ or 3.5 centimeters. This value is a measure of the mean rectified distance a neutron of 24 k. e. v. initial energy travels in water before being captured. The rectified root-mean-square distance a neutron travels from a point source in an infinite water medium is (3.5) $\sqrt{6}$ or 8.6 centimeters. Therefore, considering the fact that some of the detected neutrons will have spent about half of this latter distance passing out into the medium and about half of the distance in returning to the detector, the radius of investigation will be about 4.3 centimeters or less. Although the above calculation assumes an infinite water medium in front of the probe, it substantially applies to borehole conditions. This applicability arises from the fact that although the mean free path for the first collision at 24 k. e. v. is approximately 1 centimeter, the collision scatters the neutron in the forward direction. If the neutron passes through the borehole wall and enters the formation before making a second collision, the probability of its ever returning to the detector is appreciably diminished as a result of the large mean free path in the formation. Thus, it will be appreciated that the device is very sensitive to small variations in the topography of the borehole wall surface.

It should be understood that higher energy neutrons may be used if greater depth of investigation of the side wall is contemplated.

Figure 3:
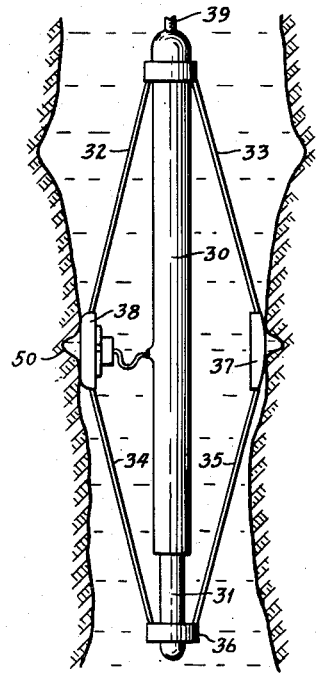
Fig. 3 is a schematic view of a further embodiment of the neutron logging probe disposed in a borehole in combination with a borehole caliper.

A valuable application of the logging device described in Fig. 2 is in combination with an ordinary borehole caliper. Fig. 3 illustrates one type of caliper in combination with a modified type of neutron logging probe constructed in accordance with the present invention.

In Fig. 3, a coarse caliper may comprise an elongated cylindrical body 30 having at its lower end a plunger membe 31 telescopically slidable in the body 30. Rigid members or struts 32 and 33 are pivoted to opposite sides of the upper end of the body 30, and corresponding struts 34 and 35, respectively, are pivotally connected to opposite sides of the lower end 36 of the plunger 31. The struts 33 and 35 support a cushion pad 37 at their inner ends, and the struts 32 and 34 similarly support a neutron logging probe 38. The pad 37 and the probe 38 are urged against opposite side walls of the borehole by a bias spring, for example (not shown) within the body 30, tending to pull in the plunger 31. The pad 37 and the probe 38 will thus follow large variations in the borehole diameter as the body 30 is raised through the borehole by a cable 39. Suitable electrical circuits within the body 30 translate the movement of the plunger 31 into electrical signals communicated to indicating apparatus at the earth's surface by conductors (not shown) within the cable 39. These electrical signals will respond to the position of the struts 34 and 35 and thus to the larger changes in the borehole diameter. A suitable caliper is disclosed by Owen H. Huston in Patent No. 2,614,164, entitled "Mutual Inductance System" and dated October 14, 1952. Clearly other caliper systems utilizing any type arm or arms urged against the borehole side wall may be used.

Figure 4:
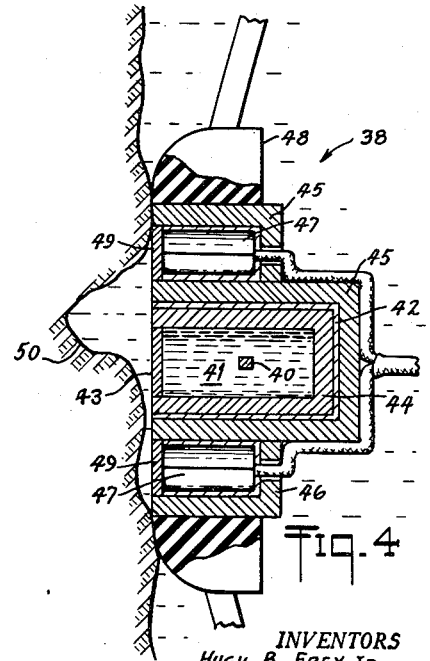
Fig. 4 is a longitudinal sectional view on an enlarged scale of the probe shown in Fig. 3.

The neutron logging probe 38, best seen in the enlarged view of Fig. 4 provides an indication of detailed variations in the borehole diameter. The probe 38 may comprise a source 40 of slow neutrons consisting, for example, of a pellet of antimony 124-beryllium embedded in a neutron moderator 41, such as deuterium in the form of heavy water (D₂O). The source 40 and the moderator 41 are contained in an elongated cylindrical container 42 which is positioned with its axis perpendicular to the borehole side wall. The end of the container 42 adjacent the side wall is closed with a cover 43 that is transparent to slow neutrons. The inner surface of the container 42 is provided with a lining 44 of any material which serves as a slow neutron reflector within the space limitations imposed by the diameter of the borehole. The lining 44 may, for example, comprise graphite or may contain a neutron multiplying fissionable isotope. This latter material acts as a booster for the source 40 and increases the available supply of the neutrons in a manner known to those skilled in the art.

The outside of the container 42 is surrounded by a cup-shaped shield 45 of cadmium, boron or any material substantially opaque to slow neutrons, with its open end facing the adjacent side wall of the borehole.

Neutrons from the source 40 are slowed by the moderator 41 and multiply-reflected by the lining 44 to such an extent that when they emerge through the cover 43 of the container 42 they are essentially at thermal energy. The diffusion length of such thermal neutrons in water as pointed out above is about 2.8 centimeters. The radius of investigation will, consequently, be in the range from 1.5 to 2.5 centimeters. The thermal neutron generating apparatus of Fig. 4 permits even smaller variations in the topography of the side wall to be accurately indicated than does the apparatus of Fig. 2.

As further shown in Fig. 4, an annular cup-shaped housing 46 of slow neutron absorbing material, such as cadmium or boron, for example, surrounds the container 42 at its end adjacent the side wall and may contain one or more thermal neutron detectors 47. The housing 46 may be embedded in a pad member 48 of the main caliper arm with the annular opening of the housing 46 facing the adjacent side wall. Suitable thermal neutron transparent windows 49, such as aluminum plates, may be provided to exclude mud from the housing 46.

As a result of the small radius of investigation, thermal neutrons will reach the formations and become lost only if the wall section is extremely smooth and substantially no mud is present between the probe 38 and side wall. In this case there will be a very low counting rate indicated by the detectors 47. If variations in the borehole diameter are present, however, such as indicated by numeral 50 in Fig. 4, the volume of mud contained therein will retain the thermal neutrons and a much higher counting rate will be recorded. The ratio of the counting rate when adjacent a formation to the counting rate when adjacent a deep cave will be roughly equal to the inverse ratio of the transport mean free paths for thermal neutrons in the formation and in the mud. This counting rate will accordingly depend upon the amount of mud present and thus yield an indication of the depth of the enlargement. Use of a higher energy source would be valuable for detecting enlargements of greater extent, but in that case the initial higher energy neutrons may pass through very small irregularities, and such irregularities would not be indicated.

For some formations, the use of a detector sensitive principally to epithermal neutrons would prove informative. Simultaneous comparison between the different neutron energies can also be obtained by having one of the two counters 47 in Fig. 4 sensitive in the epithermal region and the other responsive in the thermal region.

A main caliper log and a log produced by the neutron probe 38 are indicated in Fig. 5B and Fig. 5C, respectively, of a borehole wall section shown in Fig. 5A. The smaller variations 51, 52, 53 and 54 in the borehole wall are not revealed by the main caliper log of Fig. 5B because the mechanical arm cannot physically reach into these cavities. The vernier log of Fig. 5C clearly shows the variations 51, 52, 53 and 54, however, as peaks 51', 52', 53' and 54'.

Figs. 6 and 7 illustrate another valuable combination of the neutron logging probe of the present invention. In Fig. 6 there is shown, as an example, an electrical logging apparatus comprising a cushion member 60 supporting one or more electrodes A, M, N and urging them against the borehole side wall by means of a bowed spring mechanism such as previously described and illustrated in Fig. 1. Also supported by the cushion pad 60 is a modified embodiment 61 of the neutron logging probe of Fig. 4.

In the enlarged cross section of the pad 60 in Fig. 7 it will be seen that logging probe 61 comprises a straight gas-filled or evacuated pipe 70 having a thermal neutron transparent cover 69 adjacent the side wall and its other end terminating in an enlarged bulb 71. The bulb 71 and the pipe 70 have an exterior shielding 68 of cadmium, boron, or any other slow neutron absorbing material. The interiors of the pipe 70 and the bulb 71 have a lining 72 of graphite or other material, which possesses a high albedo or reflection coefficient for thermal neutrons and which serves as a thermal neutron reflector. However, the bulb 71 may be lined instead with a neutron multiplying fissionable material for the purpose of increasing the effective source strength, as in the case of the Fig. 4 embodiment. The bulb 71 is filled with a neutron moderator 73 such as deuterium in the form of heavy water (D₂O) or graphite in which is embedded a source 74 of either epithermal or fast neutrons. The generation of thermal neutrons by this apparatus is not different in theory from the apparatus of Fig. 4 but the neutron energy distribution will be more nearly the thermal Maxwellian distribution by virtue of the larger volume of the moderator material 73. This larger volume can be accommodated in combination with the logging apparatus through the use of the thermal neutron pipe 70 which serves to guide the neutrons from the bulky source and moderator bulb 71 to the side wall.

Embedded also in pad 60 is a cup-shaped detector assembly 75 similar to the detectors in Figs. 2 and 4. Electrodes A, M, and N for making electrical measurements may be disposed adjacent the cover 69 of the tube 70 and the detector 75, as shown. Leads from electrodes A, M, and N and from the anode and cathode of the detector 75 are schematically indicated for connection to appropriate circuits through means of a cable 76.

In operation, the slowed neutrons emanating from the cover 69 of the tube 70 will have short diffusion lengths in any mud medium and thus the radius of investigation will be very small. Any vibration or tilting of the pad 60 which would permit a mud film or wedge of liquid to enter between the electrodes and the side wall will accordingly be immediately indicated. This information is extremely valuable when recorded simultaneously with the resistivity curves since it will indicate when the electrodes are not in contact with the side wall and thus aid in the proper interpretation of the resistivity curves.

While for purposes of illustration the logging probe is shown in combination with an electrical logging pad, it should be understood that the probe may be combined with any type of well logging apparatus such as an acoustical logging system or a gamma ray logging device wherein various members in such systems are urged against the borehole side wall and it is desired to ascertain the effectiveness of this contact in view of possible irregularities in the wall surfaces.

Various other modifications of the features of the present invention will occur to those skilled in the art. Thus, it is to be kept in mind that the desired depth of investigation can be varied by varying the energy of the neutrons which are ultimately emitted from the device. The energy of these neutrons can be varied by utilizing sources of appropriate energy or by slowing down neutrons from a source by means of a moderator, such as disclosed in Figs. 4 and 7.

Moreover, the various neutron logging probes of Figs. 2, 4 and 7 may be simultaneously used to yield information indicative of the borehole side walls at zones of different transverse depths. Thus, for example, the immediate effects of mud films or of extremely small caves such as would be indicated by the probe of Fig. 7 could be logged and compared simultaneously with the results obtained from a slightly higher energy probe such as that of Fig. 2 which indicates larger caves to obtain thereby several logs indicative of the side wall structure at different transverse distances.

Many other combinations of the present probes with different well logging instruments will occur to those skilled in the art. Accordingly, invention is not to be thought of as limited to the precise embodiments disclosed, but only by the language of the appended claims.

We claim:

1. A method of detecting surface irregularities in the side wall of a borehole containing hydrogenous fluid comprising the steps of emitting substantially only slow neutrons from a point adjacent the side wall of the borehole, and detecting neutrons slowed still further by the residual fluid present between the point of neutron emission and the side wall.

2. A method of detecting surface irregularities in the side wall of a borehole containing hydrogenous liquid comprising the steps of emitting substantially only slow neutrons from a point adjacent the side wall of the borehole, and detecting neutrons thermalized by the residual liquid present between the point of neutron emission and the side wall.

3. A method of detecting surface irregularities in the side wall of a borehole containing hydrogenous liquid comprising the steps of emitting substantially only thermal neutrons from a point adjacent the side wall of the borehole and detecting the neutrons returned by the residual liquid present between the point of neutron emission and the side wall.

4. A method of detecting surface irregularities in the side wall of a borehole containing hydrogenous fluid comprising the steps of resiliently forcing a probe containing a source emitting substantially only slow neutrons against the side wall of the borehole to squeeze the bulk of the hydrogenous fluid away from the space between the source of slow neutrons and the side wall, and detecting slowed still further neutrons returning to said probe as an indication of the quantity of the residual fluid trapped by the side wall irregularities.

5. A method of detecting surface irregularities in the side wall of a borehole containing hydrogenous liquid comprising the steps of resiliently forcing a probe containing a source emitting substantially only slow neutrons against the side wall of the borehole to squeeze the bulk of the hydrogenous liquid away from the space between the source of slow neutrons and the side wall, and detecting thermal neutrons returning to said probe as an indication of the quantity of the residual liquid trapped by the side wall irregularities.

6. A method of detecting surface irregularities in the side wall of a borehole containing hydrogenous liquid comprising the steps of resiliently forcing a probe containing a source emitting substantially only thermal neutrons against the side wall of the borehole to squeeze the bulk of the hydrogenous liquid away from the space between the source of thermal neutrons and the side wall, and detecting thermal neutrons returning to said probe as an indication of the quantity of the residual liquid trapped by the side wall irregularities.

7. A method of detecting surface irregularities in the side wall of a borehole containing hydrogenous liquid comprising the steps of directing substantially only neutrons with energies of less than 100 k. e. v. towards a small area on the side wall of the borehole, and simultaneously detecting two groups of neutrons returned from the vicinity of said area with energies grouped substantially above and below one-half electron volt.

8. Apparatus for detecting surface irregularities in the side wall of a borehole containing hydrogenous liquid comprising a source emitting substantially only slow neutrons, means for resiliently forcing said source against the side wall of the borehole to squeeze the bulk of the hydrogenous liquid away from the space between said source of slow neutrons and the side wall, a detector of thermal neutrons adjacent said neutron source, and means for shielding said detector from the borehole liquid whereby said detector is responsive primarily to neutrons thermalized by the residual liquid in the space between said source and detector and the adjacent side wall of the borehole.

9. Apparatus according to claim 8 in which the source is a material containing beryllium of atomic weight 9 and antimony of atomic weight 124.

10. Apparatus for detecting surface irregularities in the side wall of a borehole containing hydrogenous liquid comprising a source emitting substantially only slow neutrons, means for resiliently forcing said source against the side wall of the borehole to squeeze the bulk of hydrogenous liquid away from the space between said source of slow neutrons and the adjacent side wall, a shield for limiting radiation of said neutrons to the adjacent side wall, a detector of thermal neutrons adjacent said neutron source, and means for shielding said detector from the borehole liquid whereby said detector is responsive primarily to neutrons thermalized by the residual liquid in the space between said source and detector and the adjacent side wall of the borehole.

11. Apparatus for detecting surface irregularities in the side wall of a borehole containing hydrogenous liquid comprising a source emitting substantially only slow neutrons, means for resiliently forcing said source against the side wall of the borehole to squeeze the bulk of the hydrogenous liquid away from the space between said source and the adjacent side wall, a moderator for thermalizing the slow neutrons, means for directing said thermalized neutrons towards the adjacent side wall, a detector of thermal neutrons adjacent said neutron source, and means for shielding said detector from the borehole liquid whereby said detector is responsive primarily to neutrons returned by the residual liquid in the space between said source and detector and the adjacent side wall of the borehole.

12. Apparatus for detecting surface irregularities in the side wall of a borehole containing hydrogenous liquid comprising a probe containing a source emitting substantially only slow neutrons, means for resiliently forcing said probe against the side wall of the borehole to squeeze the bulk of the hydrogenous liquid away from the space between said source of slow neutrons and the side wall, and means for detecting thermal neutrons returning to said probe as an indication of the quantity of the residual liquid trapped by the side wall irregularities.

13. Apparatus for detecting surface irregularities in the side wall of a borehole containing hydrogenous liquid comprising a probe containing a source emitting substantially only slow neutrons, means for resiliently forcing said probe against the side wall of the borehole to squeeze the bulk of the hydrogenous liquid away from the space between said source of slow neutrons and the side wall, and means for detecting separately and simultaneously thermal and epithermal neutrons returning to said probe as an indication of the quantity of the residual liquid trapped by the side wall irregularities.

14. Apparatus for detecting the presence of hydrogenous liquid between a pad and an adjacent borehole side wall against which the face of said pad is pressed comprising a source of neutrons, a housing mounted on said pad containing said source, a moderating substance between said source and the adjacent borehole side wall for slowing down said neutrons, a slow neutron reflecting lining for said housing, a slow neutron absorbing shield surrounding said housing, a slow neutron transparent window for said housing at the face of said pad, and means adjacent said housing for detecting thermal neutrons returning to said pad as an indication of the presence of said hydrogenous liquid.

15. Apparatus for detecting the presence of hydrogenous liquid between a pad and an adjacent borehole side wall against which the face of said pad is pressed comprising a source of neutrons, a housing containing said source, a moderating substance surrounding said source for slowing down said neutrons, a slow neutron reflecting lining for said housing, a slow neutron absorbing shield surrounding said housing, a thermal neutron transmitting tube connecting said housing to said pad for emitting thermal neutrons toward the adjacent borehole side wall, and means adjacent said housing for detecting thermal neutrons returning to said pad as an indication of the presence of said hydrogenous liquid.

16. Apparatus for detecting surface irregularities in the side wall of a borehole containing hydrogenous liquid comprising a borehole caliper having at least one pad resiliently pressed against the borehole side wall, means for measuring the transverse movement of said pad to obtain a main caliper log, a neutron probe mounted on said pad, said probe comprising a source of slow neutrons and a detector of thermal neutrons, whereby said detector is responsive primarily to neutrons thermalized by the residual liquid present in the space between said pad and the adjacent side wall of the borehole, thereby providing a vernier caliper log.

17. Apparatus for detecting surface irregularities in the side wall of a borehole containing hydrogenous liquid comprising a borehole caliper having at least one pad resiliently pressed against the borehole side wall, means for measuring the transverse movement of said pad to obtain a main caliper log, a neutron probe mounted on said pad, said probe comprising a source of thermal neutrons and a detector of thermal neutrons, whereby said detector is responsive primarily to neutrons returned by the residual liquid present in the space between said pad and the adjacent side wall of the borehole, thereby providing a vernier caliper log.

18. Apparatus for monitoring the seating of an electrical logging pad on the side wall of a borehole containing drilling fluid comprising a side wall electrical logging pad resiliently urged against the borehole side wall, a neutron logging probe mounted on said pad, said probe comprising a source emitting substantially only slow neutrons directed against the side wall, and a detector responsive to thermalized neutrons between said side wall and said pad.

References Cited in the file of this patent
UNITED STATES PATENTS

| | | |
|---|---|---|
| 2,385,378 | Piety | Sept. 25, 1945 |
| 2,469,461 | Russell | May 10, 1949 |
| 2,508,772 | Pontecorvo | May 23, 1950 |
| 2,667,583 | Herzog | Jan. 26, 1954 |
| 2,680,201 | Scherbatskoy | June 1, 1954 |